United States Patent [19]

Wolff

[11] 4,408,769
[45] Oct. 11, 1983

[54] STUFFING BOX WITH OUTER FLEXIBLE TUBE TO ALLOW SHAFT GYRATORY MOVEMENTS

[75] Inventor: Erland Wolff, Greenbrae, Calif.

[73] Assignee: Jude Engineering, Inc., San Francisco, Calif.

[21] Appl. No.: 420,891

[22] Filed: Sep. 21, 1982

[51] Int. Cl.³ .............................................. F16J 15/18
[52] U.S. Cl. .................................. 277/105; 277/112; 277/125; 277/147; 277/178
[58] Field of Search ..................................... 277/88–90, 277/102, 104–106, 112, 113, 116.4, 123, 125, 136, 137, 147, 174, 178, 200; 308/36.1, 187.1, 187.2

[56] References Cited

U.S. PATENT DOCUMENTS

| | | | |
|---|---|---|---|
| 3,009,718 | 11/1961 | Mayer | 277/89 X |
| 3,179,425 | 11/1965 | Andresen | 277/89 |
| 4,270,762 | 6/1981 | Johnston | 277/102 X |
| 4,330,135 | 5/1982 | Butterfield | 277/105 X |

FOREIGN PATENT DOCUMENTS

| | | | |
|---|---|---|---|
| 965545 | 6/1957 | Fed. Rep. of Germany | 277/105 |
| 1525951 | 5/1969 | Fed. Rep. of Germany | 277/123 |
| 247083 | 11/1947 | Switzerland | 277/106 |
| 723272 | 3/1980 | U.S.S.R. | 277/105 |

*Primary Examiner*—Robert S. Ward, Jr.
*Attorney, Agent, or Firm*—Murray & Whisenhunt

[57] ABSTRACT

Stuffing box, comprising two hollow annuli spaced apart and adapted to surround a shaft spaced from it, the annuli having annular flanges projecting towards each other. A flexible tube is provided having its opposite ends seating on the annular flanges and secured thereto in gas-tight manner, and a rigid tube is situated within the flexible tube and spaced radially from it and adapted to surround the shaft and to be spaced from it. A radially inwardly extending flange is provided at one end of the rigid tube, together with packing rings within the rigid tube, and a tubular presser member is situated in the other end of the rigid tube. Means is provided for supporting the presser member and urging it into the rigid tube to compress the packing rings against the flange.

4 Claims, 1 Drawing Figure

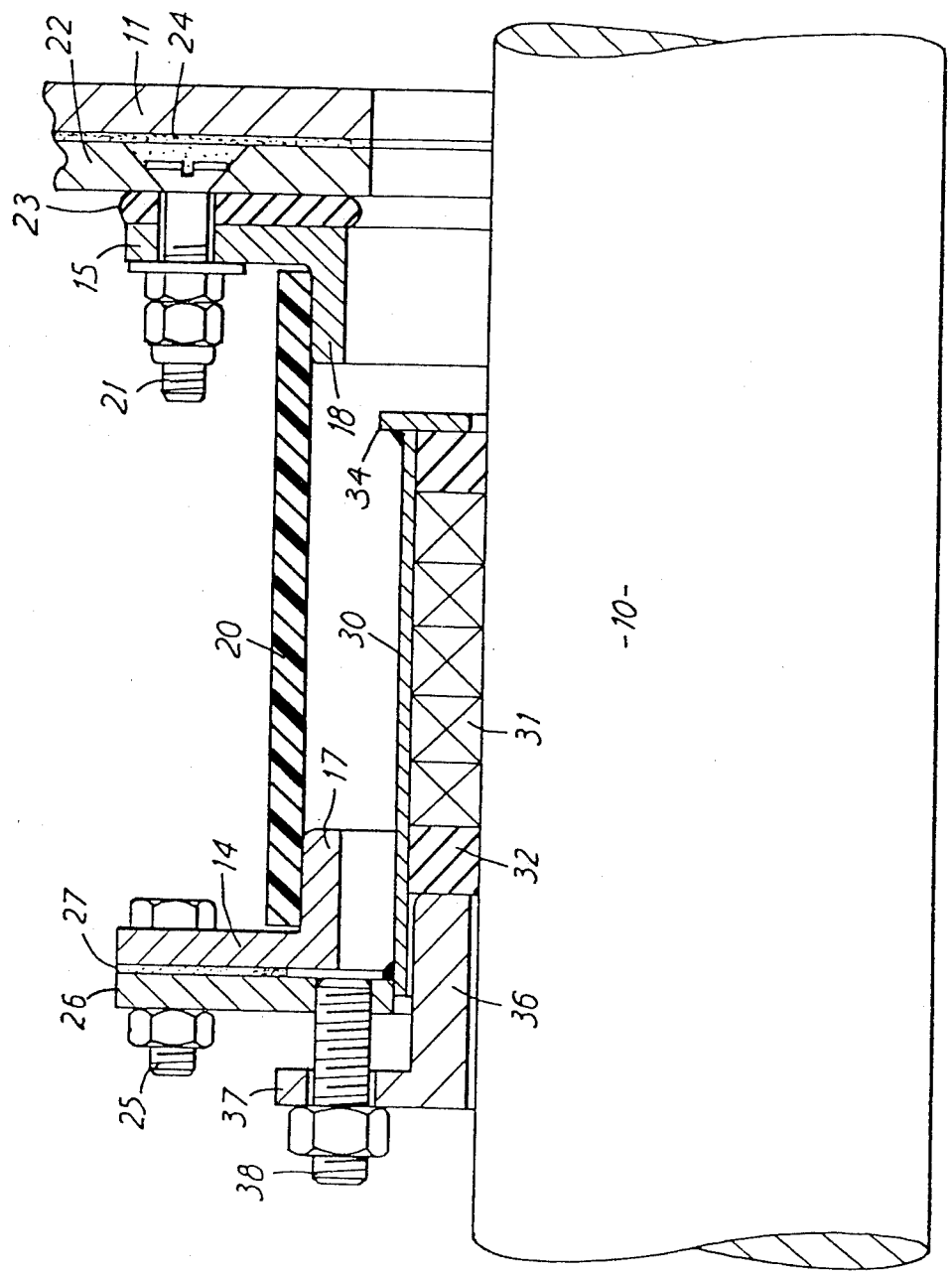

STUFFING BOX WITH OUTER FLEXIBLE TUBE TO ALLOW SHAFT GYRATORY MOVEMENTS

BACKGROUND TO THE INVENTION

This invention relates to stuffing boxes and its object is to prevent escape of gases from a container out of which a shaft projects while at the same time permitting movements of the shaft apart from its normal rotary movements around its axis. Thus in a screw type conveyer dealing with hot materials liable to give off hot gas, the screw is located in a housing through which a driving shaft projects for driving the screw. The screw may be many feet long and can have somewhat gyratory or whipping movements and therefore some clearance must be provided between the driving shaft and the housing wall so that hot gases can escape.

OBJECT OF THE INVENTION

The present invention provides a stuffing box particularly well suited for surrounding the driving shaft to prevent escape of gas while permitting the movements of the shaft.

SUMMARY OF THE INVENTION

According to the invention described in our U.S. Pat. No. 4,330,135 a stuffing box is provided comprising a hollow casing to surround a shaft, an end wall attached to one end of the casing, a tubular member located within the casing, bearing rings within said tubular member, and an annular bellows having one circular end fixed in a gas tight manner to the casing adjacent to the end wall and its other circular end surrounding the tubular member and fixed to it in a gas tight manner at the end remote from the end wall.

While this has been very successful, the present invention aims to simplify manufacture.

According to the invention we provide a stuffing box comprising two hollow annuli spaced apart and adapted to surround a shaft spaced from it, said annuli having annular flanges projecting towards each other, a flexible tube having its opposite ends seating on the annular flanges and secured thereto in gas-tight manner, a rigid tube within the flexible tube and spaced radially from it and adapted to surround the shaft and to be spaced from it, a radially inwardly extending flange at one end of the rigid tube, packing rings within the rigid tube, a tubular presser member in the other end of the rigid tube, and means for supporting the presser member and urging it into the rigid tube to compress the packing rings against said flange.

In a constructional form of the invention an annular plate is welded to the rigid tube and is bolted to that one of said hollow annuli which is remote from said flange, and the presser member has a flange which carries a screw which is threaded into a tapped bore in said annular plate whereby the presser member can be urged against the packing rings.

The flexible tube may be made of artificial or natural rubber e.g. "Buna N", Silicone rubber, Neoprene, and may be provided with two to three layers of fibreglass cloth and a helically wound stainless steel wire about 0.045 inch thick embedded in the rubber. Or it may be a flexible metal bellows.

BRIEF DESCRIPTION OF THE DRAWING

The invention will be further described by way of example with reference to the accompanying diagrammatic drawing which is a half sectional view of a stuffing box made in accordance with the invention with associated shaft and housing.

A shaft 10 enters a wall 11 of a casing and carries conveyer screw helices for conveying material within the casing. Outside the casing the shaft is surrounded by a stuffing box which allows for movements of the shaft end in a gyratory manner.

The stuffing box comprises two hollow annuli 14,15 which are spaced apart and surround the shaft and are spaced radially from the shaft.

The annuli 14,15 have annular flanges 17,18 extending towards each other. A flexible tube 20 surrounds the tube and is spaced from it and the ends of the flexible tube seat on the flanges 17,18 are secured to it in airtight manner.

The annulus 18 is bolted to a plate 22 by bolts 21 with a gasket 23 in-between. The plate 22 is bolted to the wall 11 with a gasket 24 in-between.

The annulus 14 is bolted to an annular plate 26 by bolts 25 with a gasket 27 in-between.

A rigid tube 30 surrounds the shaft and is spaced therefrom to receive asbestos packing rings 31 and carbon packing rings 32. The tube 30 has a flange 34 at one end against which the packing rings are urged by means of a tubular presser member 36 which is entered into the other end of the rigid tube. The presser member has a flange 37 which carries a screw 38 which is threaded into a tapped bore in the plate 26 so that the screw can be adjusted to urge the presser member against the packing rings.

The tube 20 is made of flexible material such as natural or artificial rubber e.g. Buna N, silicone rubber, or Neoprene, laid up with two or three layers of fibreglass cloth and a helically wound stainless steel wire, 0.045 inch thick, embedded in the rubber. By means of this flexible arrangement the flanges 14,15 support the tube 20. By using a suitable oven cured adhesive the tube 20 is strongly attached to the flanges.

I claim:

1. A stuffing box comprising two hollow annuli spaced apart and adapted to surround a shaft spaced from it, said annuli having annular flanges projecting towards each other, a flexible tube having its opposite ends seating on the annular flanges and secured thereto in gas-tight manner, a rigid tube within the flexible tube and spaced radially from it and adapted to surround the shaft and to be spaced from it, a radially inwardly extending flange at one end of the rigid tube, packing rings within the rigid tube, a tubular presser member in the other end of the rigid tube, and means for supporting the presser member and urging it into the rigid tube to compress the packing rings against said flange.

2. A stuffing box as claimed in claim 1 wherein an annular plate is welded to the rigid tube and is bolted to that one of said hollow annuli which is remote from said flange, and the presser member has a flange which carries a screw which is threaded into a tapped bore in said annular plate whereby the presser member can be urged against the packing rings.

3. A stuffing box as claimed in claim 1 wherein the flexible tube is made of artificial or natural rubber with layers of fibreglass cloth and a helically wound stainless steel wire embedded in it and the tube is attached to the flange by adhesive.

4. A stuffing box as claimed in claim 1 wherein the presser member carries an adjusting screw threaded into a tapped bore in a plate that is adapted to surround the shaft and is welded to the rigid tube, said plate being also bolted to the adjacent annular flange.

* * * * *